(12) United States Patent
Beagley et al.

(10) Patent No.: US 7,778,262 B2
(45) Date of Patent: Aug. 17, 2010

(54) RADIO FREQUENCY MULTIPLE PROTOCOL BRIDGE

(75) Inventors: James J. Beagley, Draper, UT (US);
Jared T. Lemke, Pleasant Grove, UT (US); Peter L. Taylor, Orem, UT (US)

(73) Assignee: Vantage Controls, Inc., Orem, UT (US)

( * ) Notice: Subject to any disclaimer, the term of this patent is extended or adjusted under 35 U.S.C. 154(b) by 721 days.

(21) Appl. No.: 11/634,909

(22) Filed: Sep. 6, 2006

(65) Prior Publication Data

US 2007/0183449 A1   Aug. 9, 2007

Related U.S. Application Data

(60) Provisional application No. 60/715,115, filed on Sep. 7, 2005.

(51) Int. Cl.
*H04L 12/28* (2006.01)
(52) U.S. Cl. .................. 370/401; 370/501; 370/573; 370/480; 370/503; 370/502
(58) Field of Classification Search ......... 370/501–503, 370/401, 480, 573
See application file for complete search history.

(56) References Cited

U.S. PATENT DOCUMENTS

| | | | |
|---|---|---|---|
| 2,482,773 A | 9/1949 | Hieronymus | |
| D163,736 S | 6/1951 | Bangert, Jr. | |
| 2,828,413 A | 3/1958 | Bowers | |
| 2,853,585 A | 9/1958 | Danziger et al. | |
| 3,284,667 A | 11/1966 | Harris et al. | |
| 3,491,249 A | 1/1970 | Rabinow | |
| 3,579,030 A | 5/1971 | Bentham et al. | |
| 3,689,886 A | 9/1972 | Durkee | |
| 3,697,821 A | 10/1972 | Johnson | |
| 3,706,914 A | 12/1972 | Van Buren | |
| 3,707,682 A | 12/1972 | Harris | |
| 3,736,591 A | 5/1973 | Rennels et al. | |
| 3,746,923 A | 7/1973 | Spira et al. | |
| 3,763,394 A | 10/1973 | Blanchard | |
| 3,784,875 A | 1/1974 | Baker et al. | |
| 3,867,596 A | 2/1975 | Schadow | |
| 3,868,546 A | 2/1975 | Gilbreath et al. | |

(Continued)

FOREIGN PATENT DOCUMENTS

CA   2 245 671   9/2003

(Continued)

OTHER PUBLICATIONS

Davidson, "CEBus Update," Circuit Cellar Ink, pp. S2-S10, Building Automation Special., #15 1990.

(Continued)

*Primary Examiner*—Vincent P Harper
*Assistant Examiner*—Michael Irace
(74) *Attorney, Agent, or Firm*—McCarter & English, LLP (57) ABSTRACT

An apparatus for interfacing with devices using different communication protocols. The apparatus may scan a range of known frequencies for a communication protocol. The apparatus may decode and translate the communication protocol into a common interface language. The apparatus may include a pair of separate and co-located transceivers to accomplish the interface.

19 Claims, 6 Drawing Sheets

U.S. PATENT DOCUMENTS

| | | |
|---|---|---|
| 3,868,547 A | 2/1975 | Kappenhagen et al. |
| 3,885,116 A | 5/1975 | Kodaira |
| 3,918,062 A | 11/1975 | Haruki et al. |
| 3,940,660 A | 2/1976 | Edwards |
| 3,980,954 A | 9/1976 | Whyte |
| 3,986,423 A | 10/1976 | Rossum |
| 3,996,441 A | 12/1976 | Ohashi |
| 4,016,561 A | 4/1977 | Parker et al. |
| 4,057,751 A | 11/1977 | Bonsignore et al. |
| 4,060,735 A | 11/1977 | Pascucci et al. |
| 4,095,139 A | 6/1978 | Symonds et al. |
| D249,141 S | 8/1978 | Mayo |
| 4,123,756 A | 10/1978 | Nagata et al. |
| 4,131,777 A | 12/1978 | Bailey et al. |
| 4,156,866 A | 5/1979 | Miller |
| 4,163,218 A | 7/1979 | Wu |
| 4,169,972 A | 10/1979 | Black et al. |
| 4,185,531 A | 1/1980 | Oberheim et al. |
| 4,187,528 A | 2/1980 | Morriss |
| 4,194,099 A | 3/1980 | Mickelson |
| 4,196,388 A | 4/1980 | Weller et al. |
| 4,200,862 A | 4/1980 | Campbell et al. |
| 4,203,096 A | 5/1980 | Farley et al. |
| 4,206,443 A | 6/1980 | Britton |
| 4,225,808 A | 9/1980 | Saraceni |
| 4,246,494 A | 1/1981 | Foreman et al. |
| 4,253,048 A | 2/1981 | Osako |
| 4,259,619 A | 3/1981 | Wall |
| 4,262,180 A | 4/1981 | Walter |
| 4,274,045 A | 6/1981 | Goldstein |
| 4,277,727 A | 7/1981 | LeVert |
| 4,300,090 A | 11/1981 | Weber |
| 4,303,811 A | 12/1981 | Parkinson |
| 4,334,171 A | 6/1982 | Parman et al. |
| 4,336,464 A | 6/1982 | Weber |
| 4,338,595 A | 7/1982 | Newman |
| 4,339,632 A | 7/1982 | Early et al. |
| 4,359,670 A | 11/1982 | Hosaka et al. |
| 4,381,456 A | 4/1983 | Saito et al. |
| 4,388,567 A | 6/1983 | Yamazaki et al. |
| 4,390,814 A | 6/1983 | Peek |
| 4,392,187 A | 7/1983 | Bornhorst |
| 4,395,660 A | 7/1983 | Waszkiewicz |
| 4,418,333 A | 11/1983 | Schwarzbach et al. |
| 4,421,966 A | 12/1983 | Pounds |
| 4,436,972 A | 3/1984 | Scanlon |
| 4,437,169 A | 3/1984 | Bertenshaw et al. |
| 4,455,546 A | 6/1984 | Roszel |
| 4,463,287 A | 7/1984 | Pitel |
| 4,468,542 A | 8/1984 | Pounds |
| 4,471,493 A | 9/1984 | Schober |
| 4,484,190 A | 11/1984 | Bedard |
| 4,485,374 A | 11/1984 | Meserow et al. |
| 4,489,385 A | 12/1984 | Miller et al. |
| 4,491,843 A | 1/1985 | Boubouleix |
| 4,504,778 A | 3/1985 | Evans |
| 4,521,843 A | 6/1985 | Pezzolo et al. |
| 4,523,132 A | 6/1985 | Christiansen et al. |
| 4,524,288 A | 6/1985 | Schimmelpennink et al. |
| 4,527,198 A | 7/1985 | Callahan |
| 4,532,395 A | 7/1985 | Zukowski |
| 4,540,917 A | 9/1985 | Luchaco et al. |
| 4,550,276 A | 10/1985 | Callahan et al. |
| 4,560,909 A | 12/1985 | Peil |
| 4,563,592 A | 1/1986 | Yuhasz et al. |
| 4,575,660 A | 3/1986 | Zaharchuk et al. |
| 4,582,967 A | 4/1986 | Brumit et al. |
| 4,590,614 A | 5/1986 | Erat |
| D285,066 S | 8/1986 | Liss et al. |
| 4,611,198 A | 9/1986 | Levinson et al. |
| 4,628,440 A | 12/1986 | Thompson |
| 4,631,377 A | 12/1986 | Imazeki et al. |
| 4,635,040 A | 1/1987 | Masot |
| 4,638,299 A | 1/1987 | Campbell |
| 4,644,320 A | 2/1987 | Carr et al. |
| 4,680,536 A | 7/1987 | Roszel et al. |
| 4,684,822 A | 8/1987 | Angott |
| 4,689,547 A | 8/1987 | Rowen et al. |
| 4,691,341 A | 9/1987 | Knoble et al. |
| 4,695,820 A | 9/1987 | D'Aleo et al. |
| 4,697,227 A | 9/1987 | Callahan |
| 4,703,306 A | 10/1987 | Barritt |
| 4,714,983 A | 12/1987 | Lang |
| 4,716,409 A | 12/1987 | Hart et al. |
| 4,719,446 A | 1/1988 | Hart |
| 4,727,296 A | 2/1988 | Zaharchuk et al. |
| 4,728,949 A | 3/1988 | Platte et al. |
| 4,737,769 A | 4/1988 | Masot |
| 4,745,351 A | 5/1988 | Rowen et al. |
| 4,749,917 A | 6/1988 | Angott et al. |
| 4,751,385 A | 6/1988 | Van Benthusysen et al. |
| 4,755,792 A | 7/1988 | Pezzolo et al. |
| 4,764,981 A | 8/1988 | Miyahara et al. |
| 4,772,824 A | 9/1988 | Gulledge |
| 4,772,825 A | 9/1988 | Tabor et al. |
| 4,783,581 A | 11/1988 | Flowers et al. |
| 4,792,731 A | 12/1988 | Pearlman et al. |
| 4,797,599 A | 1/1989 | Ference et al. |
| 4,814,776 A | 3/1989 | Caci et al. |
| 4,823,069 A | 4/1989 | Callahan et al. |
| 4,825,209 A | 4/1989 | Sasaki et al. |
| 4,843,386 A | 6/1989 | Wolf |
| 4,864,588 A | 9/1989 | Simpson et al. |
| 4,876,552 A | 10/1989 | Zakman |
| 4,878,010 A | 10/1989 | Weber |
| 4,880,950 A | 11/1989 | Carson et al. |
| 4,889,999 A | 12/1989 | Rowen |
| 4,893,062 A | 1/1990 | D'Aleo et al. |
| 4,908,806 A | 3/1990 | Nickolaus |
| 4,918,432 A | 4/1990 | Pauley et al. |
| 4,918,717 A | 4/1990 | Bissonnette et al. |
| 4,924,109 A | 5/1990 | Weber |
| 4,924,151 A | 5/1990 | D'Aleo et al. |
| 4,940,903 A | 7/1990 | Brown, Jr. et al. |
| 4,948,987 A | 8/1990 | Weber |
| D310,349 S | 9/1990 | Rowen |
| 4,955,084 A | 9/1990 | Umetsu et al. |
| D311,382 S | 10/1990 | Mayo et al. |
| D311,485 S | 10/1990 | Jacoby et al. |
| D311,678 S | 10/1990 | Graef et al. |
| 4,980,806 A | 12/1990 | Taylor et al. |
| D313,738 S | 1/1991 | Mayo et al. |
| 4,995,053 A | 2/1991 | Simpson et al. |
| 5,003,318 A | 3/1991 | Berneking et al. |
| 5,012,225 A | 4/1991 | Gill |
| 5,017,837 A | 5/1991 | Hanna et al. |
| 5,027,106 A | 6/1991 | Lizzi et al. |
| 5,028,853 A | 7/1991 | Brown, Jr. et al. |
| 5,030,893 A | 7/1991 | Spira et al. |
| 5,034,602 A | 7/1991 | Garcia, Jr. et al. |
| D319,429 S | 8/1991 | D'Aleo et al. |
| 5,041,825 A | 8/1991 | Hart et al. |
| 5,051,720 A | 9/1991 | Kittirutsunetorn |
| 5,059,871 A | 10/1991 | Pearlman et al. |
| 5,079,559 A | 1/1992 | Umetsu et al. |
| 5,086,385 A | 2/1992 | Launey et al. |
| 5,099,193 A | 3/1992 | Moseley et al. |
| 5,103,209 A | 4/1992 | Lizzi et al. |
| 5,109,222 A | 4/1992 | Welty |
| 5,113,498 A | 5/1992 | Evan et al. |
| D327,255 S | 6/1992 | D'Aleo et al. |
| 5,128,855 A | 7/1992 | Hilber et al. |
| 5,146,153 A | 9/1992 | Luchaco et al. |
| 5,170,487 A * | 12/1992 | Peek .......................... 455/45 |

| Patent Number | Kind | Date | Inventor |
|---|---|---|---|
| 5,175,477 | A | 12/1992 | Grissom |
| 5,187,655 | A | 2/1993 | Post et al. |
| 5,189,412 | A | 2/1993 | Mehta et al. |
| 5,191,265 | A | 3/1993 | D'Aleo et al. |
| 5,209,560 | A | 5/1993 | Taylor et al. |
| 5,225,765 | A | 7/1993 | Callahan et al. |
| 5,237,264 | A | 8/1993 | Moseley et al. |
| 5,239,205 | A | 8/1993 | Hoffman et al. |
| 5,247,293 | A | 9/1993 | Nakagawa |
| 5,248,919 | A | 9/1993 | Hanna et al. |
| 5,280,296 | A | 1/1994 | Tan et al. |
| D344,264 | S | 2/1994 | D'Aleo et al. |
| 5,311,656 | A | 5/1994 | Eldershaw |
| 5,321,736 | A | 6/1994 | Beasley |
| 5,327,426 | A | 7/1994 | Dolin, Jr. et al. |
| 5,340,954 | A | 8/1994 | Hoffman et al. |
| 5,349,362 | A | 9/1994 | Forbes et al. |
| 5,357,170 | A | 10/1994 | Luchaco et al. |
| 5,361,184 | A | 11/1994 | El-Sharkawi et al. |
| 5,361,985 | A | 11/1994 | Rein et al. |
| 5,367,133 | A | 11/1994 | Schmidt et al. |
| 5,373,411 | A | 12/1994 | Grass et al. |
| 5,382,947 | A | 1/1995 | Thaler et al. |
| 5,399,940 | A | 3/1995 | Hanna et al. |
| 5,400,041 | A | 3/1995 | Strickland |
| 5,400,246 | A | 3/1995 | Wilson et al. |
| 5,401,927 | A | 3/1995 | Lundell et al. |
| 5,430,356 | A | 7/1995 | Ference et al. |
| 5,436,510 | A | 7/1995 | Gilbert |
| 5,452,291 | A | 9/1995 | Eisenhandler et al. |
| 5,455,464 | A | 10/1995 | Gosling |
| 5,455,761 | A | 10/1995 | Kushiro et al. |
| 5,463,286 | A | 10/1995 | D'Aleo et al. |
| 5,467,264 | A | 11/1995 | Rauch et al. |
| 5,473,202 | A | 12/1995 | Mudge et al. |
| 5,481,750 | A | 1/1996 | Parise et al. |
| 5,490,144 | A | 2/1996 | Tran et al. |
| 5,495,406 | A | 2/1996 | Kushiro et al. |
| 5,523,631 | A | 6/1996 | Fishman et al. |
| 5,555,150 | A | 9/1996 | Newman, Jr. |
| 5,563,459 | A | 10/1996 | Kurosawa et al. |
| 5,565,855 | A | 10/1996 | Knibbe |
| 5,565,865 | A | 10/1996 | So |
| 5,574,431 | A | 11/1996 | McKeown et al. |
| 5,588,760 | A | 12/1996 | So |
| 5,598,322 | A | 1/1997 | Von Arx et al. |
| 5,637,930 | A | 6/1997 | Rowen et al. |
| 5,638,296 | A | 6/1997 | Johnson et al. |
| 5,640,141 | A | 6/1997 | Myllymäki |
| 4,095,139 | A | 7/1997 | Symonds et al. |
| 5,657,005 | A | 8/1997 | Seebeck et al. |
| 5,668,358 | A | 9/1997 | Wolf et al. |
| 5,711,588 | A | 1/1998 | Rudisill |
| 5,726,644 | A | 3/1998 | Jednacz et al. |
| 5,736,965 | A | 4/1998 | Mosebrook et al. |
| 5,748,828 | A | 5/1998 | Steiner et al. |
| 5,796,382 | A | 8/1998 | Beeteson |
| 5,801,345 | A | 9/1998 | Mikula-Curtis et al. |
| 5,861,809 | A | 1/1999 | Eckstein et al. |
| 5,905,442 | A | 5/1999 | Mosebrook et al. |
| 5,912,443 | A | 6/1999 | Hasunuma |
| 5,960,942 | A | 10/1999 | Thornton |
| 5,962,109 | A | 10/1999 | Schwietz |
| 5,975,711 | A | 11/1999 | Parker et al. |
| 5,977,901 | A | 11/1999 | Fenner |
| 5,982,103 | A | 11/1999 | Mosebrook et al. |
| 6,032,202 | A | 2/2000 | Lea et al. |
| 6,080,940 | A | 6/2000 | Rice |
| 6,091,205 | A | 7/2000 | Newman, Jr. et al. |
| 6,092,903 | A | 7/2000 | Higgins, Jr. |
| 6,100,659 | A | 8/2000 | Will et al. |
| 6,140,987 | A | 10/2000 | Stein et al. |
| 6,169,256 | B1 | 1/2001 | Hanahara et al. |
| 6,180,895 | B1 | 1/2001 | Hutchinson et al. |
| 6,184,481 | B1 | 2/2001 | Chen |
| 6,192,282 | B1 | 2/2001 | Smith et al. |
| 6,199,136 | B1 | 3/2001 | Shteyn |
| 6,201,364 | B1 | 3/2001 | Will et al. |
| 6,207,913 | B1 | 3/2001 | Nakajima et al. |
| 6,233,132 | B1 | 5/2001 | Jenski |
| 6,310,609 | B1 | 10/2001 | Morgenthaler |
| 6,331,687 | B1 | 12/2001 | Dunk et al. |
| 6,355,890 | B1 | 3/2002 | Kuroda |
| 6,359,562 | B2 | 3/2002 | Rubin |
| 6,369,524 | B1 | 4/2002 | Sid |
| 6,369,800 | B1 | 4/2002 | Nading et al. |
| 6,400,271 | B1 | 6/2002 | Davies, Jr. et al. |
| D461,782 | S | 8/2002 | Butler et al. |
| 6,453,687 | B2 | 9/2002 | Sharood et al. |
| 6,467,924 | B2 | 10/2002 | Shipman |
| 6,493,874 | B2 | 12/2002 | Humpleman |
| 6,510,995 | B2 | 1/2003 | Muthu et al. |
| 6,523,696 | B1 | 2/2003 | Saito et al. |
| 6,549,190 | B1 | 4/2003 | Windrem |
| 6,555,774 | B1 | 4/2003 | Nielsen |
| 6,575,607 | B1 | 6/2003 | Klemish et al. |
| 6,593,530 | B2 | 7/2003 | Hunt |
| 6,608,271 | B2 | 8/2003 | Duarte |
| 6,618,764 | B1 | 9/2003 | Shteyn |
| 6,640,141 | B2 | 10/2003 | Bennett |
| 6,646,843 | B1 | 11/2003 | Newman, Jr. et al. |
| 6,674,248 | B2 | 1/2004 | Newman, Jr. et al. |
| 6,680,730 | B1 | 1/2004 | Shields et al. |
| 6,753,661 | B2 | 6/2004 | Muthu et al. |
| 6,774,328 | B2 | 8/2004 | Adams et al. |
| 6,797,902 | B2 | 9/2004 | Farage et al. |
| 6,882,111 | B2 | 4/2005 | Kan et al. |
| 6,909,424 | B2 | 6/2005 | Liebenow et al. |
| 6,931,364 | B1 | 8/2005 | Anturna |
| 6,950,087 | B2 | 9/2005 | Knox et al. |
| 6,952,715 | B1 * | 10/2005 | Kronz ........................ 709/203 |
| 6,965,848 | B2 | 11/2005 | Ballus |
| 6,967,448 | B2 | 11/2005 | Morgan et al. |
| 6,967,565 | B2 | 11/2005 | Lingemann |
| 7,130,774 | B2 | 10/2006 | Thomas et al. |
| 2001/0000422 | A1 | 4/2001 | Sid |
| 2001/0047250 | A1 | 11/2001 | Schuller et al. |
| 2001/0047251 | A1 | 11/2001 | Kemp |
| 2001/0055003 | A1 | 12/2001 | Chi et al. |
| 2002/0016639 | A1 | 2/2002 | Smith et al. |
| 2002/0026533 | A1 | 2/2002 | Dutta et al. |
| 2002/0037004 | A1 | 3/2002 | Bossemeyer et al. |
| 2002/0137479 | A1 * | 9/2002 | Tsui ............................ 455/92 |
| 2002/0196771 | A1 * | 12/2002 | Vij et al. ..................... 370/349 |
| 2003/0009315 | A1 | 1/2003 | Thomas et al. |
| 2003/0012035 | A1 | 1/2003 | Bernard |
| 2003/0052770 | A1 | 3/2003 | Mansfield, Jr. et al. |
| 2003/0056012 | A1 | 3/2003 | Modeste et al. |
| 2003/0129969 | A1 | 7/2003 | Rucinski |
| 2003/0158954 | A1 * | 8/2003 | Williams .................... 709/230 |
| 2003/0227894 | A1 | 12/2003 | Wang et al. |
| 2003/0233429 | A1 | 12/2003 | Matte et al. |
| 2004/0024624 | A1 | 2/2004 | Ciscon et al. |
| 2004/0037288 | A1 | 2/2004 | Bourgart et al. |
| 2004/0038683 | A1 | 2/2004 | Rappaport et al. |
| 2004/0054747 | A1 | 3/2004 | Breh et al. |
| 2004/0088082 | A1 | 5/2004 | Ahmed |
| 2004/0113945 | A1 | 6/2004 | Park et al. |
| 2004/0143428 | A1 | 7/2004 | Rappaport et al. |
| 2004/0225811 | A1 | 11/2004 | Fosier |
| 2004/0267385 | A1 | 12/2004 | Lingemann |
| 2007/0019682 | A1 * | 1/2007 | Krzyzanowski ............ 370/503 |

| | | | |
|---|---|---|---|
| 2007/0019683 | A1* | 1/2007 | Kryzyanowski .............. 370/503 |

FOREIGN PATENT DOCUMENTS

| | | |
|---|---|---|
| DE | 30 08 339 A1 | 9/1981 |
| DE | 30 12 840 A1 | 10/1981 |
| DE | 32 21 873 A1 | 1/1984 |
| DE | 32 24 997 A1 | 1/1984 |
| DE | 219 637 A1 | 3/1985 |
| DE | 43 08 161 A1 | 9/1994 |
| DE | 103 06 080 A1 | 8/2004 |
| EP | 0 022 516 | 1/1981 |
| EP | 0 040 339 | 11/1981 |
| EP | 0 054 582 | 6/1982 |
| EP | 0 196 347 | 10/1986 |
| EP | 0 293 569 | 12/1988 |
| EP | 0 327 128 | 8/1989 |
| EP | 0 346 614 | 12/1989 |
| EP | 0 357 136 | 3/1990 |
| EP | 0 361 734 | 4/1990 |
| EP | 0 435 224 | 7/1991 |
| EP | 0 466 152 | 1/1992 |
| EP | 0 513 443 | 11/1992 |
| EP | 0 552 769 | 7/1993 |
| EP | 0 555 869 | 8/1993 |
| EP | 0 558 349 | 9/1993 |
| EP | 0 616 451 | 9/1994 |
| EP | 0 626 635 | 11/1994 |
| EP | 0 687 078 | 12/1995 |
| FR | 2 702 115 | 9/1994 |
| GB | 1 090 891 | 11/1967 |
| GB | 1 215 009 | 12/1970 |
| GB | 2 076 180 | 11/1981 |
| GB | 2 097 918 | 11/1982 |
| GB | 2 099 222 | 12/1982 |
| GB | 2 166 328 | 4/1986 |
| WO | WO-86/06890 | 11/1986 |
| WO | WO-90/08418 | 7/1990 |
| WO | WO-93/13507 | 7/1993 |
| WO | WO-95/32595 | 11/1995 |
| WO | WO-97/29560 | 8/1997 |

OTHER PUBLICATIONS

Davidson, "CEBus Gets Physical," Circuit Cellar Ink, pp. 103-104, Feb./Mar. 1991.
Davidson, "CEBus Update: More Physical Details Available," Circuit Cellar Ink, pp. 66-72, Jun./Jul. 1991.
Davidson, "CEBus Goes Coax," The Comptuer Applications Journal, vol. 25, pp. 108-110, Feb./Mar. 1992.
"Wireless hookups offered through radio technology," UCLA.
Ademco, "No. 5827BD Wireless Bidirectional Console used with No. 5800TH Transmitter Module Installation Instructions and Operating Guide," Aug. 1993.
Ademco, "No. 5827BD Wireless Bidirectional Console Installation and Setup Guide," Feb. 2004.
Advanced Control Technologies, Inc., "Innovative and Quality Solutions to Control Problems!" www.act-solutions.com, at least as early as Aug. 23, 2005.
Advanced Control Technologies, Inc., "Introducing the Next Generation of Home Control Systems HomePro RF," Mar. 17, 2006.
"The search for standard automation protocols narrows," Air Conditioning Heating & Refrigeration News, vol. 191, No. 5, p. 9, Jan. 1994.
Anonymous, "Echelon releases LONWORKS control network protocol, opening up huge potential," Sensor Review, vol. 16, No. 4, p. 9, 1996.
Anonymous, "New products offer high-speed transmission in control networks," Sensor Review, vol. 13, No. 4, p. 39, 1993.
"1 Million Nodes," Appliance Manufacturer, vol. 44, No. 1, p. 16, Jan. 1996.
Ballerini et al., "AISI Research and MPR Ltd. to Develop and Market Home Automation Products for Telecommunications Industry," Business Wire, Sec. 1, p. 1, Jun. 2, 1989.
Berger, "Plug-In Remote Controls for the Whole House," Home Mechanix, vol. 88, No. 762, pp. 26-29, 76, Feb. 1992.
Bertsch, "Development Tools for Home Automation," IEEE Transactions on Consumer Electronics, vol. 36, No. 4, pp. 854-858, Nov. 1990.
Beuth Verlag GMBH, "DIN 19 245 Teil 1: Profibus," DIN Deutsches Institute fur Normung E.V., Apr. 1991.
Boughton, "Hard-Wired Home: Automated systems can control everything from lights to curling irons to hot tubs—all at the push of a button," The San Francisco Chronicle, p. Z1, Aug. 30, 1995.
Buffkin, "CEBus, LonWorks heading from 'HomeLAN,'" Electronic Engineering Times, vol. 847, p. 58, May 8, 1995.
Bushby, "The BACnet communication protocol for building automation systems," Ashrae Journal, pp. 14-21, Apr. 1991.
"Getting all your appliances on the same wavelength," Business Week, vol. 3088, p. 92E, Jan. 23, 1989.
Butler, "Personal Technology at Home with Technology: LonWorks may run home of the future," The Atlanta Journal the Atlanta Constitution, p. P6, Nov. 19, 1995.
Butler, "Wireless Light Switch Flexible, Easy to Install," The Columbus Dispatch, p. 10H, Oct. 23, 1993.
Butler, "Add-On Light Switches Eliminate Wiring Hassles," Roanoke Times & World News, p. 3, Jun. 6, 1995.
Bybee, "Build Reacts: The Radio-Electronics Advanced Control System," Radio-Electronics, vol. 59, No. 10, p. 65, Oct. 1988.
Caristi, "Carrier-current remote control," Electronics Now, vol. 66, No. 6, p. 49, Jun. 1, 1995.
Carlin, "On the bus," Sound & Image, vol. 4, No. 3, p. 20, Fall, 1994.
"What's new in CBus Shop™?" www.cbus-shop.com, at least as early as Jun. 18, 2004.
"U105RHH001BPW1: Handheld Remote Unit—Pearl White," www.cbus-shop.com, at least as early as Jun. 18, 2004.
Coffey, "CEBus," email, at least as early as Jul. 2004.
"Open the pod bay door," Compute!, vol. 14, No. 11, p. 44, Dec. 1992.
Cooper, "X10 FAQ html version. Based on the X10 FAQ version 1.08," Jan. 8, 1995.
Crevier, "Scott Crevier's X-10 Web Interface," at least as early as Nov. 11, 2002.
Cross et al., "A Fiber Optic Home Automation System," IEEE Transactions on Consumer Electronics, vol. 39, No. 3, pp. 636-645, Aug. 1993.
Davidson, "Echelon's Local Operating Network," Circuit Cellar Ink, pp. 74-77, Jun./Jul. 1991.
Davidson, "Take a Tour of the Bright Home," The Computer Applications Journal, vol. 25, pp. 14-21, Feb./Mar. 1992.
Davidson, "CEBus: A New Standard in Home Automation," Circuit Cellar Ink, pp. 40-52, Aug./Sep. 1989.
Davidson, "CEBus Update," Circuit Cellar Ink, pp. S2-S10, Building Automation Special, #15 1990.
Davidson, "Habitech 94," The Computer Applications Journal, vol. 47, pp. 46-51, Jun. 1994.
Davis, "Zigbee Aims at Home, Utility Markets," www.reed-electronics.com/electronicnews/article/CA469135%20, Oct. 7, 2004.
Delaney, "The CEBus perspective," Appliance Manufacturer, vol. 41, No. 5, p. 31, May 1993.
Dichristina et al., "Controlling the Home," Popular Science, vol. 240, No. 5, p. 48, May 1992.
Dilouie, "Automated Controls Can Save Energy," Facilities Design & Management, vol. 14, No. 11, p. 35, Nov. 1995.
Douligeris et al., "The Consumer Electronic Bus Symbol Encoding Sublayer: A Twisted Pair Implementation," IEEE, pp. 385-388, 1992.
Douligeris, "Intelligent Home Systems: Low-cost computers and fiber optics make it possible to implement systems that can integrate data, voice, and visual communications inside the home," IEEE Communications Magazine, pp. 52-61, Oct. 1993.
Douligeris et al., "Communications and Control for a Home Automation System," IEEE, pp. 171-175, 1991.
Driscoll, "A Timeline for Home Automation," www.eddriscoll.com, 2002.
Edden, "Modelling CEBus Home Automation with Knowledge Based Tools," IEEE, pp. 623-627, 1990.
"LONworks gets interface boards," Electronic Engineering Times, p. 54, Jul. 3, 1995.

Electronic Industries Association. EIA-600 (Sections 600.10, 600.31, 600.32, 600.33, 600.35, 600.37, 600.38, 600.41, 600.42, 600.81, and 600.82). Feb. 1995.
"New CEBus devices target energy management," Electronic News, vol. 40, No. 2006, p. 48, Mar. 21, 1994.
"Intellon-IBM CEBus deal eyes energy/com system," Electronic News, vol. 41, No. 2063, p. 24, May 1, 1995.
"Intellon spins home automation roadmap," Electronic News, vol. 41, No. 2064, p. 46, May 8, 1995.
"WA firm wins US automation award," Electronics Australia, vol. 57, No. 1, p. 123, Jan. 1995.
Evans, "Solving Home Automation Problems Using Artificial Intelligence Techniques," IEEE, pp. 395-400, 1991.
Evans, "CAL: Part of the Solution," Home Automation & Building Control, pp. 59-67, Jul. 1995.
Evans, The CEBus Standard User's Guide: A Complete Technical Overview, The Training Department Publications, 1996.
Fisher, "Switch-On CEBus: A CAL Interpreter," The Computer Applications Journal, vol. 31, pp. 24-30, Feb. 1993.
"Home automation," Futurist, vol. 28, No. 5, p. 7, Sep./Oct. 1994.
GE. Appendix A, GE Authentication and Encryption Algorithm. Version II. Nov. 1995.
Gfeller et al., "Wireless In-House Data Communication via Diffuse Infrared Radiation," Proceedings of the IEEE, vol. 61, No. 11, pp. 1474-1486, Nov. 1979.
Gikas, "Total Home Control Home Control from Your Car," Home Mechanix, vol. 91, No. 794, p. 24, Apr. 1995.
Gilmore, "The integrated automated educated house," Popular Science, vol. 236, No. 6, p. 104, Jun. 1990.
Gilmore, "The World's Smartest Houses," Popular Science, vol. 237, No. 3, pp. 56-65, Sep. 1990.
Gilmore et al., "Open (automated) house," Popular Science, vol. 237, No. 4, p. 48, Oct. 1990.
"Home Automation: GSI Home Automation Controller—The Next Generation in Home Automation!" www.globalsuccessinc.com, 2003.
Gorzelany, "Hot new electronics," J. Consumers Digest, vol. 28, No. 3, p. 74, May/Jun. 1989.
Home Controls, Inc., Home Automation and Networking Catalog, No. 52, Fall 2005.
Homepro, "ZTH100 Radio Frequency Wireless Controller," 2001.
"Z-Wave Information," www.homeseer.com, at least as early as Jun. 21, 2004.
"Z-Wave Lamp Module (HomePro)," www.homeseer.com, at least as early as Jun. 21, 2004.
"Z-Wave Remote Control (ivory)," www.homeseer.com, at least as early as Jun. 21, 2004.
Horowitz et al., The Art of Electronics, 1989, Cambridge University Press, 2nd Ed., pp. 595-598.
House, "CEBus for the Masses," Home Automation & Building Control, pp. 61-68, Apr. 1995.
Hunt et al., "Are We There Yet?: CEBus Ready to Bring 'Home of the Future' into the Present," Chicago Tribune, p. 22, Mar. 1, 1996.
Intellon Corporation, "Intellon HomePlug® Family of Products," 2005.
Intellon Corporation, "SSC P485 PL Transceiver IC," at least as early as Jul. 3, 2006.
Interim Standard. IS-60.04 Node Communications Protocol, Part 6: Application Layer Specification. Apr. 1996.
Iversen, "A New Push Begins to Sell a Home Bus," Electronics, vol. 61, No. 12, p. 40, Jun. 1988.
"Building Blocks for Home Automation," IW, p. 23, May 15, 1995.
Jancsurak, "Smart receptacle for smart plugs," Electronic Industries Association, vol. 41, No. 4, p. 62, Apr. 1993.
Karpinksi, "In-home networks draw industry attention," Interactive Age, vol. 2, No. 6, p. 39, Jan. 16, 1995.
Keefe, Jr., "Power Line Modem for Home Control," Electronics Now, p. 65, Mar. 1994.
Khawand et al., "Common Application Language (CAL) and Its Integration into a Home Automation System," IEEE, pp. 157-162, 1991.
Kingery, "Which One Should I Use?" at least as early as Jun. 30, 2006.
Kingery, "Which One Should I Use, Part XII (Preamble)," at least as early as Jun. 30, 2006.
Kingery, "'Digital X-10' Which One Should I Use, Part XIII (Preamble)," at least as early as Jun. 30, 2006.
Kingery, "'Two Way and Extended Code' Which One Should I Use Part XIV (Preamble)," at least as early as Jun. 30, 2006.
Kingery, "Which One Should I Use #17. What is 'Extended Code'? (and does it wear a tuxedo?) Part 1—'Different Ways of Counting," at least as early as Jun. 30, 2006.
Kingery, "Which One Should I Use #18. What is 'Extended Code'? Part 2—'Big Indians and Little Indians," at least as early as Jun. 30, 2006.
Kirschner, "Smarts at Last?" Popular Science, vol. 247, No. 1, p. 38, Jul. 1995.
Kleiman, "MacDaniel's Advice: Introduction to the X10 System," Sep. 24, 2001.
Krause, "Echelon-CEBus rivalry tangles decoder specs," Electronic News, vol. 41, No. 2067, p. 1, May 29, 1995.
Krause, "EIA sees potential CEBus role in U.S. NII Proposal," Electronic News, vol. 40, No. 2021, p. 38, Jul. 4, 1994.
Kung, "Perceived requirements concerning home automation," Trialog, pp. 1-5, Dec. 1995.
Lamson & Sessions, Product Installation Instructions, 2004.
Langreth, "Slow going for smart homes," Popular Science, vol. 242, No. 2, p. 60, Feb. 1993.
Leeb, "A User Interface for Home-Net," IEEE, pp. 897-902, 1994.
Lutron Electronics Co., Inc., "Homeworks® seeTouch J Ordering Guide," 2003.
Lutron Electronics Co., Inc., "Homeworks® Interactive Vareo®-Style Local Lighting Controls," 1998.
Lutron Electronics Co., Inc., Residential Lighting Controls Catalog, at least as early as Jun. 28, 2006.
Lutron Electronics Co., Inc., "RadioRA® Wireless Home Lighting Control RA-IR, RB-IR Setup and Installation Guide Addendum for RadioRA® Infrared Interface," 2001.
Lutron Electronics Co., Inc., "RadioRA® Wireless Home Lighting Control RAMC-MFE, RBMC-MFE Setup and Installation for a RadioRA® Multi-Function Entry Master Control," 2001.
Lutron Electronics Co., Inc., "RadioRA® Wireless Home Lighting Control Installation Instructions for Visor Control Transmitter," 2001.
Markwalter et al., "Design Influences for the CEBus Automation Protocol," IEEE, pp. 145-153, 1991.
McGrath, "Seizing the future," Electric Perspectives, vol. 14, No. 6, p. 14, Nov./Dec. 1990.
McLeister, "Builders in Subdivisions, Scattered Sites Gain Edge with Home Automation," Professional Builder, pp. 82-83, Feb. 1995.
McLeister, "Dramatic Changes Lie Ahead For Home Automation," Professional Builder, p. 101, Feb. 1994.
Meth, "Where Will Smart Homes Get Their Smarts?" Electronic Design, vol. 43, No. 19, pp. 61-64, Sep. 18, 1995.
Munro, "Automating the Home," Washington Technology, p. 1, Nov. 9, 1995.
Murray, "Wired and ready," Popular Science, vol. 247, No. 2, p. 36, Aug. 1995.
Nisley, "Two-Way Power Line Communication," The Computer Applications Journal, vol. 25, pp. 74-81, Feb./Mar. 1992.
Pacelle, "Automation Is Knocking at U.S. Homes—TVs Can Talk to Thermostats, but Cost Keeps Most Doors From Opening," Asian Wall Street Journal, p. 7. Sep. 29, 1992.
Palenchar, "Z-Wave Takes on Home-Automation Market," www.twice.com, Mar. 22, 2004.
Pargh, "High-tech functions improve new light switches," Chicago Sun-Times. p. 7, Oct. 7, 1990.
Parks, "The State of Home Systems," The Computer Applications Journal, vol. 25, pp. 12-13, Feb./Mar. 1992.
Parks Associates, Home Systems 94: Home Controls, Parks Associates, Dallas, 1994.
Parks et al., X-10 Ltd. Myths and Reality: The Facts Behind the Company and the Technology, Parks Associates, Dallas, 1994.
Phillips, "Installing a Home Alarm: Protect your property and enjoy extra conveniences with an affordable do-it-yourself system," Home Mechanix, vol. 90, No. 782, p. 60, Feb. 1994.

Price, "Product Development Flow Using Domosys HeadStart Suite," www.hometoys.com/htinews/aug99/articles/domosys/domosys.htm, Aug. 1999.
"Cyberhouse Software Wins Mark of Excellence Award from Home Automation Association," PR Newswire, p. 325, Mar. 25, 1996.
"From start to finish: Molex's Smart House home automation system means quality," Professional Builder, vol. 59, No. 10, p. 18, Oct. 1994.
"Home automation networks links public utility," Professional Builder, vol. 59, No. 7, p. 64, Jul. 1994.
"Home automation & electronics," Professional Builder, vol. 60, No. 2, p. 350, Mid-Jan. 1995.
"Exclusive survey results: Home buyers & the intelligent house," Professional Builder, vol. 60, No. 19, p. 13, Dec. 1995.
Rabbie, title unknown, 1992.
"CEBus Developments," Radio-Electronics, vol. 62, No. 8, p. 4, Aug. 1991.
Remlich, Jr., "Intelligent gas appliances," Appliance Manufacturer, vol. 41, No. 3, p. 63, Mar. 1993.
"RF Locker," at least as early as Jul. 2004.
Rochfort, "Sensory experience," Custom Builder, vol. 9, No. 5, p. S-28, Sep./Oct. 1994.
Ruling, "The Wybron Autopilot," TCI, vol. 29, No. 4, p. 54, Apr. 1995.
Schade, "Convenient Remote-Control Light Switching Saves Energy," Energy & Automation, vol. 9, No. 1, pp. 37-39, Jan./Feb. 1987.
Schade, "Switching of Lighting Installations by Remote Control," Elektrische Energie-Technik, vol. 29, No. 2, p. 18, Jun./Jul. 1984.
Schade, "New Aspects in the Horizontal Power Supply of Lighting Installations," Siemens Power Engineering, vol. 6, No. 4, pp. 238-239, Jul./Aug. 1984.
Schofield, "Home Automation Takes Off: Intellon products support a 'home electronic highway,'" Design News, pp. 84-87, Apr. 10, 1995.
"x-10 is both a Company and the Technology that it developed," www.shed.com/x10.html, at least as early as Jun. 30, 2006.
"Introducing Digital Wireless Lighting and Appliance Control," www.smarthomepro.com, at least as early as Jun. 21, 2004.
"Z-Wave Radio Frequency Wireless Controller," www.smarthomeusa.com, at least as early as Jun. 19, 2004.
"Sophisticated Lighting Control for Your Home," www.smarthome.com, at least as early as Jun. 18, 2004.
"Getting Started," www.smarthome.com, at least as early as Jun. 21, 2004.
"A Full-Featured Dimmer for Every Home!" www.smarthome.com, at least as early as Jun. 21, 2004.
"What is X10?" www.smarthome.com, at least as early as Jun. 21, 2004.
"Automatically Turn on X10 Lights When You Enter the Room!" www.smarthome.com, at least as early as Jun. 18, 2004.
"Control Lights and Appliances from the Comfort of Your Sofa!" www.smarthome.com, at least as early as Jun. 21, 2004.
Stauffer, "The Smart House System," The Computer Applications Journal, vol. 31, pp. 14-23, Feb. 1993.
Strassberg, "Home Automation Buses: Protocols really hit home," EDN, pp. 69-80, Apr. 13, 1995.
Taber, "The Arrival of a World Without Wires," Business for Central New Jersey, vol. 2, No. 3, Section 1, p. 3, Feb. 13, 1989.
Tanenbaum, Computer Networks, Prentice-Hall, Inc., Englewood Cliffs, New Jersey, pp. 144, 271-275, 1989.
"Lighting control (Buyers Guide)," TCI, vol. 28, No. 10, p. 56, Dec. 1, 1994.
Texas Instruments, Chipcon Products from Texas Instruments, 2006.
Teyssier, "BatiBUS: BatiBUS System Design Principles," Jun. 1990.
Uhara et al., "Development of HI (Home Information) Control System," Sharp Technical Journal, vol. 59, pp. 39-42, Aug. 1994.
"Lighting & Appliance Control," www.unitysystemshomemanager.com, at least as early as Jun. 23, 2004.
"What is X10?" unknown, at least as early as Jul. 18, 2006.
"X-10 Technology Transmission Theory," unknown, at least as early as Jul. 18, 2006.
Wacks, "The Impact of Home Automation on Power Electronics," IEEE, pp. 3-9, 1993.
Williams, "Brightening Up The House: Latest Technology, Marketing Developments Bring Sophisticated Home Automation Closer to the Masses," Chicago Tribune, p. 1, Mar. 3, 1996.
Winick, "The RF Medium in the Home—The Move to Spread Spectrum," IEEE Transactions on Consumer Electronics, vol. 37, No. 2, pp. 108-115, May 1991.
"Wireless hookups offered through radio technology," UCLA, As early as Aug. 2005.
"Let There Be Light," www.x10.com/news/articles/0309_light.htm, at least as early as Jul. 18, 2006.
"SuperRemote Home Control Kit," www.x10.com, at least as early as Jun. 18, 2004.
"X10 Powerline Carrier (PLC) Technology," www.x10.com/support/technology1.htm, at least as early as Jun. 30, 2006.
X10PRO, "X10 Platform Basics," at least as early as Jun. 30, 2006.
Yoshida, "LONWorks connects," Electronic Engineering Times, vol. 769, p. 16, Oct. 25, 1993.
Zhonglei et al., "Simultaneous Control Signal and Power Transmission Through Mechanical Rotary Joint Without Wiring Connection," IEEE, pp. 1589-1593, 1996.

* cited by examiner

RADIO FREQUENCY MULTIPLE PROTOCOL BRIDGE

CROSS-REFERENCE TO RELATED APPLICATIONS

This application claims the benefit of U.S. Provisional Application No. 60/715,115, filed Sep. 7, 2005, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. Field of the Invention

This invention relates to a method, apparatus, and system for interfacing between electronic devices and more particularly relates to a method, apparatus, and system for communication between electronic devices using different protocols and different modulation schemes.

2. Background Art

Advances in technology have enabled manufacturers of many consumer products to automate their products and make customer use of the product more convenient. Many products today provide remote access of a product to a customer through radio waves. For example, people can open their garages without leaving their car and can determine whether security sensors in their house have been tripped. The problem, however, is that these devices often operate on different radio frequencies or use different communication protocols so that each product must have a unique corresponding device to interpret the radio frequency transmissions. As more and more products allow for remote access, the number of corresponding radio frequency devices increases. This creates clutter and makes operation of the devices cumbersome, which often negates the desired convenience to the customer.

For example, Manufacturer A may make a motion detector and Manufacturer B may make automatic window blinds. Both may use some type of radio frequency protocol to enable remote access, but each operates at a different radio frequency, and they may each use different communication protocols to interact with a corresponding remote device. Neither remote device can work with the other product however.

From the foregoing discussion, it will be appreciated that it would be an advancement in art to have a multiple protocol apparatus that is compact and cost-effective. It would be an additional advancement to have such an apparatus that could interface with devices having different radio frequencies that span large band gaps. It would be a further advancement to provide such an apparatus that could interface with devices having different types of modulation, be it amplitude modulation or frequency modulation. It would be a further advancement to have such an apparatus that is dynamically upgradeable such that new devices can be added. Such an apparatus is disclosed and claimed herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

SUMMARY OF THE DISCLOSURE

The invention disclosed herein has been developed in response to the present state of the art, and in particular, in response to the problems and needs in the art that have not yet been fully solved by currently available radio frequency interface devices. Accordingly, the present invention has been developed to provide an apparatus, system, and method for interfacing between electronic devices that overcome many or all of the above-discussed shortcomings present in the art.

The illustrative apparatus which interfaces between electrical devices is provided with a plurality of modules configured to functionally execute one or more of the following steps: implementing the communication protocol(s) of one or more electronic devices, scanning for a first signal containing information transmitted in a learned communication protocol from one or more of the electrical devices, receiving and recognizing the first signal, decoding the first signal using the appropriate communication protocol to extract the desired information, translating the information extracted from the signal into a predetermined language, creating a second signal containing the translated information using a second communication protocol, sending the second signal to another electrical device, and receiving an acknowledgment that the second signal was received by the other electrical device.

These modules in the described illustrative embodiments include a scanning module, a decoding module, a translation module, a send/receive module, and a handshake module. The apparatus, in one illustrative embodiment, is configured to scan known frequencies on which multiple third-party and/or proprietary radio frequency devices operate. If the apparatus recognizes a signal in a known communication protocol on any of the frequencies, the apparatus may then demodulate and/or decode the signal to extract the desired information and then translate the information into a common predetermined communication language for sending to another electrical device.

An illustrative system of the present invention is also disclosed to interface between radio frequency devices. The system may be embodied in wireless network having programmable software, firmware, and hardware. In particular, the system, in one illustrative embodiment, includes a processor and a power supply. The system may also contain one or more radio frequency sensors or antenna. The system may also contain an AM/FM interface, a radio frequency sensor/antenna, and transceiver. A bus may operably connect the processor, sensors, transceiver, and third party radio frequency (AM/FM) interface.

In one illustrative embodiment, the system includes a memory containing the modules that make up the system discussed above. The system may also include a controller that acts as a backend central control system. In one illustrative embodiment, the controller may communicate with the apparatus wirelessly. In another illustrative embodiment, the controller may communicate with the apparatus through any number of electronic connections, including low-voltage wiring, fiber optic, infra red, power line carrier and other media as can be devised by those skilled in the art.

An illustrative method of the present invention is also presented for interfacing between radio frequency devices. The method in the illustrative embodiments substantially includes the steps necessary to carry out the functions presented above with respect to the operation of the described apparatus and system. In one illustrative embodiment, the method includes determining the frequency of one or more radio devices, scanning known frequencies for a signal using a known communication protocol and decoding the communication protocol. The method may also include the steps of converting the decoded information in the signal into a predetermined interface language and creating a communication packet containing the converted communication protocol for sending to controller. In another illustrative embodiment, the method includes the step of receiving an acknowledgment that the communication packet was received by the radio frequency device controller. The method steps disclosed herein may also be embodied as operations carried out by the computer-readable code of a computer program product.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same illustrative embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Another illustrative aspect of the present invention includes minimizing the total scanning time on any particular frequency by an apparatus such that the possibility of a missed signal on another frequency is reduced. In one illustrative embodiment, the apparatus may only analyze a small fraction of a signal to determine if the signal is a valid signal using a known protocol. When a valid signal is detected, the apparatus will proceed to analyze the whole signal, otherwise the signal is discarded and the apparatus continues scanning.

Another illustrative aspect of the present invention includes limiting the total scanning time for all of the frequencies scanned by an apparatus. In one embodiment, each communication protocol for which an apparatus is designed to scan is weighted to determine the resources used by that communication protocol. If the available resources are overextended such that the apparatus would likely miss a signal while scanning, the apparatus may dynamically optimize its scanning procedure to reduce the likelihood of a missed signal while scanning, prohibit additional communication protocols, or require the elimination of one of the communication protocols.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment" or "illustrative embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to computer program product may take any form capable of generating a signal, causing a signal to be generated, or causing execution of a program of machine-readable instructions on a digital processing apparatus. A computer program product may be embodied by a transmission line, a compact disk, digital-video disk, a magnetic tape, a Bernoulli drive, a magnetic disk, a punch card, flash memory, integrated circuits, or other digital processing apparatus or memory device which can be arrived at by those skilled in the art.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It must be noted that, as used in this specification and the appended claims, the singular forms "a," "an," and "the" include plural referents unless the context clearly dictates otherwise. Further, as used herein, the terms "comprising," "including," "containing," "characterized by," and grammatical equivalents thereof are inclusive or open-ended terms that do not exclude additional, unrecited elements or method steps.

Figure 1:
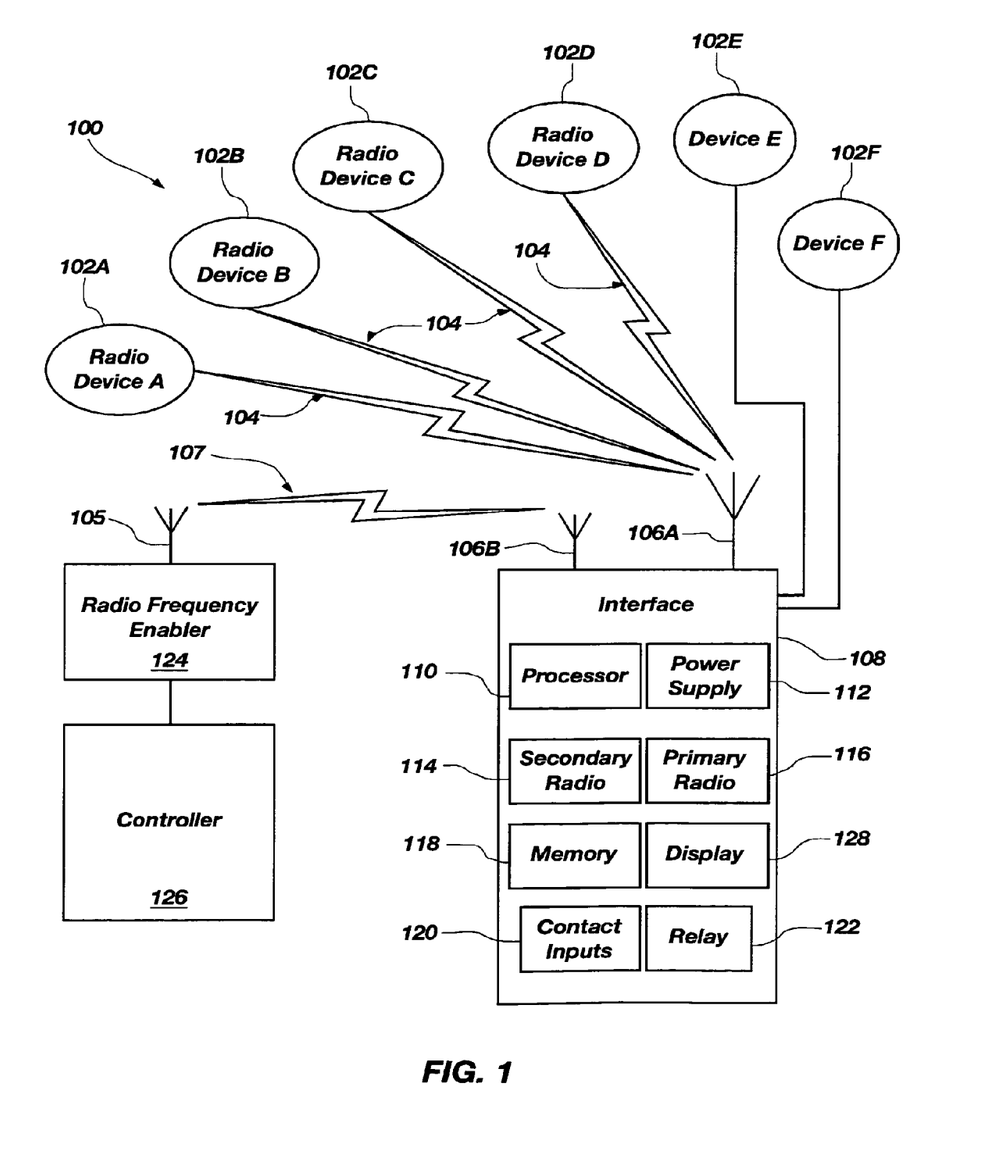
FIG. 1 is a schematic block diagram illustrating one illustrative embodiment of a system for interfacing between radio frequency devices in accordance with the present invention.

FIG. 1 depicts a system, generally designated at 100, according to the present invention. The system 100 may include one or more radio devices 102A-102D and wired devices 102E and 102F. The devices 102A-102F may be third party devices or proprietary devices that emit a radio frequency signal. In one embodiment, the devices 102A-102F are off-the-shelf devices. For example, radio device 102A may be any of a number of fobs, including, but not limited to an engine starter, a garage door opener, a keyless entry device, network access device, a home lighting access device, a home environment access device, and the like. In one embodiment, radio device 102B may be a motorized device capable of receiving a radio frequency signal and transmitting status signals. For example, radio device 102B may be automatic window blinds that can be raised or lowered through a radio-controlled motor. In one illustrative embodiment, radio device 102B is a motorized blind manufactured by SOMFY®. Radio device 102C may be a motion sensor or other home security device capable of emitting a radio signal. In one embodiment, radio device 102D is a proprietary device specifically manufactured for use in the system. Device 102E may be a switch capable of transmitting a low voltage signal, including a signal indicating a momentary switch closure. Device 102F may be a device capable of accepting a low voltage signal, such as a signal indicating a momentary switch closure. Other types of suitable devices for use with the present invention include all types of radio controlled devices, including garage door openers, ceiling fans, motion sensors, garage door openers, remote controls, lighting controls and blind controls.

The radio devices 102A-102D may communicate with an interface 108 by means of radio waves 104. In one embodiment, the interface 108 includes a radio frequency antenna 106A to pick up the radio waves 104. The interface 108 may have a range from the devices 102A-102D of up to about 50 feet. In another embodiment, the radio devices 102A-102D communicate with the interface 108 through a wired connection. The interface 108 can send and receive signals to and from the devices 102A-102D via the antenna 106A. It will be appreciated that each device 102A-102D may use its own distinct communication protocol. Thus, in one embodiment, the interface 108 can recognize multiple communication protocols to thereby communicate with all of devices 102A-102D. The devices 102E and 102F may communicate with interface 108 via a wired connection. In one embodiment, the wired connection is a low voltage wired connection.

The interface 108 may also include a processor 110 for executing control commands. The processor may be an Atmel MEGA Processor. In another embodiment, the processor 110 may be an ARM processor. The interface 108 may also include a power supply 112. In one embodiment, the power supply may be an AC to DC power supply. The power source may also be an AC power source, such as from a power grid, or a battery.

The interface 108 may include a third party radio frequency interface, which in the illustrative embodiment is represented as a secondary radio interface 114. The secondary radio interface 114 can be programmed to communicate with any radio frequency device within predetermined frequency ranges. In one embodiment, the frequency range is between about 100 MHZ and about 600 MHZ. In another embodiment, the frequency range is between about 600 MHZ and about 1000 MHZ. In still another embodiment, the frequency range is between about 300 MHZ and 1000 MHZ.

It will be appreciated by those of skill in the art that the secondary radio interface 114 can be programmed to read and decode radio frequency devices in other frequencies ranges and many different communication protocols. In one illustrative embodiment, the secondary radio interface 114 may use half duplex bi-directional radio frequency communication.

In one embodiment, the interface 108 includes a common language interface module, which in the illustrative embodiment is represented as a primary radio interface 116. The primary radio interface 116 may send and receive signals 107 through antenna 106B. The primary radio interface 116 may be a universal asynchronous radio transceiver of a kind known in the industry. In one embodiment, the primary radio interface 116 includes a transceiver which is configured to operate as part of the common language interface module. The primary radio interface 116 is generally configured to handle a single protocol, both incoming and outgoing and in this manner operates as a common language interface module. In another embodiment, the primary radio interface 116 operates in the frequency range of about 902 MHZ to 928 MHZ.

It will be appreciated by those of skill in the art that the interface 108 may therefore include two separate co-located radio transceivers, namely the primary radio interface 116 and the secondary radio interface 114.

A memory 118 may store executable code for operating the system 100. It will be appreciated by those of skill in the art that the code may also be embodied as hardware or firmware. The memory 118 may include one or more translation modules for bridging communication between the secondary radio interface 114 and the primary radio interface 116. The translation modules are executed by processor 110.

The memory 118 could include separate translation modules for communicating with each device 102A-102D. This is due to the fact that each of the devices 102A-102D may be manufactured by different manufacturers. Traditionally, each manufacturer uses its own proprietary communications protocol with its devices. For this reason, a separate translation module may be required for each device 102A-102D.

The secondary radio interface 114 and the primary radio interface 116 may cause the execution of the translation modules to accomplish the functionality associated with each one. For example, an incoming signal from any of the devices 102A-102D is received by secondary radio interface 114. Once received, the interface 108 calls upon the appropriate translation module to recognize the protocol of the signal, decode the signal using the appropriate communication protocol to extract the desired information, and translate the information extracted from the signal into the common language. The primary radio interface 116 then transmits the information in the common language.

Likewise, a signal may be received at the primary radio interface 116. The interface 108 may then call upon the appropriate translation module to translate information in the signal into the specified third party's communication protocol. The interface 108 can then send the signal to the appropriate device 102A-102D through the secondary radio interface 114.

In one illustrative embodiment, the translation modules may format the information, such as control commands, into the appropriate communications protocol required by the intended recipient device. This may include the appropriate headers, preambles, commands, etc. required to communicate with the devices 102A-102D. This may also include the correct encoding scheme, how to start or end a message, handshaking, and error correction schemes. This may further include the correct frequency and modulation schemes. Likewise, the translation modules are able to decode the message into the common interface language. In one embodiment, the translation modules are dynamically upgradeable such that new devices may be added to the system 100 at any time.

In order to create a translation module for a communication protocol, the communication protocol must be identified and analyzed. In the case of a third party manufacturer, it is preferable to secure the cooperation of the manufacturer to provide the information on its proprietary protocol. The third party protocol may also utilize a proprietary communication language. For example, the language may include commands and status information. For example, in the case of automated blinds, the commands may include "up," "down," "open," and "close." These commands must be correlated to the generic commands of the common interface language which may include commands having the same meaning. Thus, the translation module can translate the "up" command in the common interface language to the "up" command of the third party protocol and vice versa. In this sense, the interface 108 is able to mimic a third party control device. That is, the controlled devices 102A-102D do not know that the command originated from the interface 108 instead of its own remote control device.

In one illustrative embodiment, the interface 108 includes a relay 122, which is a low-voltage relay of a kind known in the art. The relay may be a 1 amp 40 VDC relay. Interface 108 also includes the appropriate circuitry to drive relay 122. Interface 108 may send a signal to device 102F using the relay 122. In actual use, a detected signal 104 or 107 could cause the relay 122 to be activated to emulate a contact switch closure to device 102F. In another embodiment, the interface 108 may include a contact input 120 to detect a momentary switch closure. When a momentary switch closure is detected through contact input 120, the interface 108 then translates this information into the common interface language and sends a message to a controller 126. Device 102E may provide the contact input signal. The controller 126 executes programming in response to that contact input 120, which may include sending a signal back to the interface 108 instructing it to close the relay 122 as well as carrying out any number of pre-programmed instructions, such as sending a signal to any of devices 102A-102D.

The inclusion of the contact inputs 120 allows the interface 108 to receive input from wired third-party devices, such as most passive infrared motion detectors, door contacts, stress sensors, light sensors, humidity and temperature sensors, smoke and carbon monoxide detectors, garage door openers and more. The inclusion of the relay 122 allows the interface 108 to control devices as well as emulate devices that are responsive to switch closures.

The interface 108 may also include a display 128 to facilitate use of the system 100 by a user. In one embodiment, the display 128 is an LED display.

The system 100 also includes a controller, such as the controller 126 shown in FIG. 1. Suitable controllers include the C-BOX™ Controller, C-BOX LE Controller, and INFUSION™ Controller manufactured by Vantage Controls, Inc. Other suitable controllers include desktop computers, laptop computers, and other computing devices. The controller 126 may form part of a commercial or a residential automation control systems. The controller 126 may form part of a computer network. In that regard, the controller 126 may also be part of a network of any sort. The controller 126 may be operably connected to a radio frequency enabler 124 to facilitate communication with the interface 108. In one embodiment, the radio-frequency enabler 124 includes a radio frequency antenna 105 for sending and receiving signals 107 to and from the antenna 106B of the interface 108. A suitable radio frequency enabler includes the RADIOLINK® Enabler manufactured by Vantage Controls, Inc.

The range between the controller 126 and the interface 108 may be up to about 150 feet. In one embodiment, the radio frequency enabler 124 is built into the controller 126. In another embodiment, the interface 108 is wired to the controller 126 and uses an RS-232 protocol. In another embodiment, the interface 108 is wired to the controller 126 using low voltage communications bus.

In one embodiment, the interface 108 acts as a radio frequency bridge. On one end of the interface 108 is a network, such as a home automation network or computer network, that may include the controller 126. Through CPU negotiation and transfer, the interface 108 forms a bridge between the network and third-party devices 102A-102F. On the third-party devices 102A-102F side of the interface 108 there will be an in and/or out communication protocol.

For example, one of the devices 102A-102F in the system 100 communicates with the controller 126 and receives commands from it to control a set of blinds 102B that are controlled through a radio protocol. The interface 108 would receive a command from the controller 126, emulate the SOMFY® blind protocol and control the device 102B. Likewise, the interface 108 could bridge to a motion sensor 102C that sends out a radio signal when it detects motion. The interface 108 would receive that signal, convert it to a message to the controller 126, which would alert a user or carry-out some other preprogrammed operation. The system 100 is capable of having multiple third-party protocols running simultaneously. Thus, one advantage of the present invention is that a single interface 108 can communicate with multiple different manufacturers' products, as represented at 102A-102F, instead of requiring multiple devices to communicate with the products 102A-102F. The interface 102 integrates and bridges the devices 102A-102F and allows outside interface capability.

From the foregoing, it will be appreciated that the system 100 recognizes different types of third-party devices 102 and can recognize all of their communication protocols and all of their different ways of passing communication packets back and forth. The interface 108 is configured to integrate this down to one common interface language and makes that available to an outside network. In one illustrative embodiment, that outside network is a network containing the controller 126. In another illustrative embodiment, the outside network could be a wired proprietary network. In another illustrative embodiment, the outside network could be an RS-232 outside interface that could then be utilized by anything with that particular communication protocol capability. In a wired embodiment, the connection may include without limitation, category 5 wire, Ethernet, and or use any other media format which can be selected by those skilled in the art. It will be appreciated that the interface 108 advantageously acts as a universal translator.

With some devices, for example some key fob devices 102A, they are multi-frequency units and must be aligned with devices on their network. This requires significant power from these battery-operated devices. If they were powered up all the time, their battery would drain very quickly. Accordingly, some key fob devices 102A go into a power saving or "hibernation" mode. The system 100 of the present invention allows a user to hit a button on the key fob device 102A which wakes up, transmits, goes back to sleep and it never has to wake up again if the user doesn't ever hit a button again. The battery-operated key fob typically has a much simpler radio frequency protocol to save power.

The system also allows a user to lower the window blinds 102B because the motion sensor 102C was tripped, even though they are made by different manufacturers using different protocols. In this scenario, when the motion sensor 102C is tripped, it sends a signal to the interface 108. The interface decodes and translates the signal into the common interface language. The interface 108 then sends a signal 107 to the controller 126 indicating that the motion sensor 102C has been tripped. Associated with this, is programming on the controller 126 which instructs the controller 126 to cause the blinds 102B to lower if the motion sensor 102C has been tripped. The controller 126 would send the interface 108 a common interface packet using the common interface language. The interface 108 would receive the signal and determine what action to take. For example, the command from the controller 126 may be to "Interface with the blinds 102B and send the user's particular command to it to lower the blinds." The interface 108, knowing the particular communication protocol for the blind 102B, would form a communication packet to go out over that communication protocol and then indicate to the internal logic that a command is ready to go. When the interface 108 finds a time slot it will transmit on the particular frequency used by the blinds 102B and using the modulation protocol associated with the blinds 102B and with appropriate timing with the third-party device 102B, lower the blinds. Thus, two previously unrelated devices are able to interact one with another.

It will be appreciated that it is within the scope of the present invention to provide embodiments of the present invention which can transmit to one or more radio frequency devices using multiple protocols. Using the disclosure provided herein, those skilled in the art will readily be able to arrive at embodiments of the invention providing such features.

Figure 2:
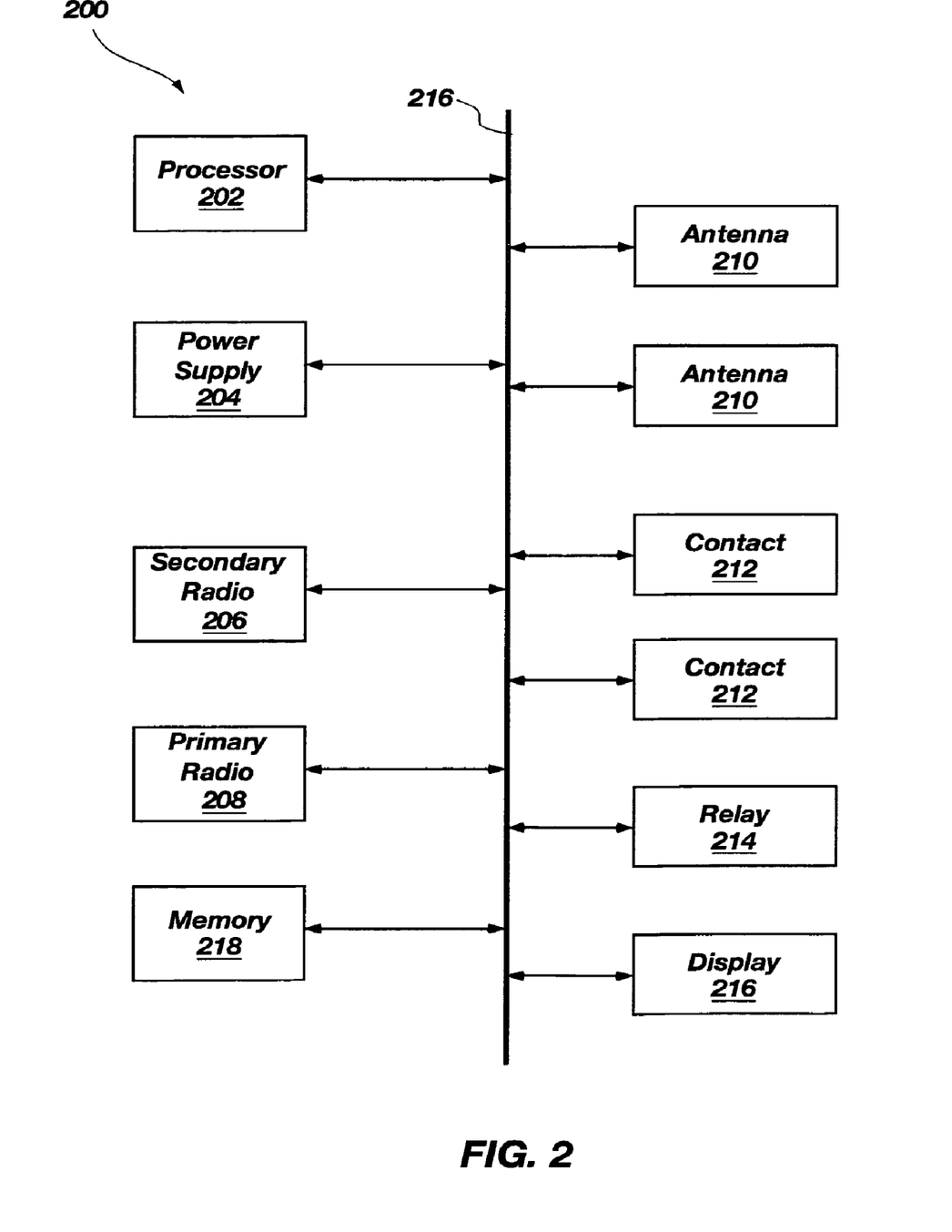
FIG. 2 is a schematic block diagram illustrating one illustrative embodiment of an apparatus for interfacing between a radio frequency devices in accordance with the present invention.

Referring to FIG. 2, an apparatus 200 according to the present invention is illustrated. In one illustrative embodiment, the apparatus 200 is the interface 108 of FIG. 1. The apparatus 200, may include a processor 202 and a power supply 204 of the type discussed in connection with the system above. The apparatus 200 may also include an secondary radio interface 206, a primary radio interface 208, and a memory 218, as discusses above. The apparatus 200 also include, antennas 210, contact inputs 212, at least one relay 214, and a display 218 to facilitate communication with remote radio frequency devices and/or radio frequency control devices. The processor 202, power supply 204, secondary radio interface 206, primary radio interface 208, memory 218, antennas 210, contact inputs 212, relay 214, and display 218 may be operably connected via communication bus 216.

Figure 3:
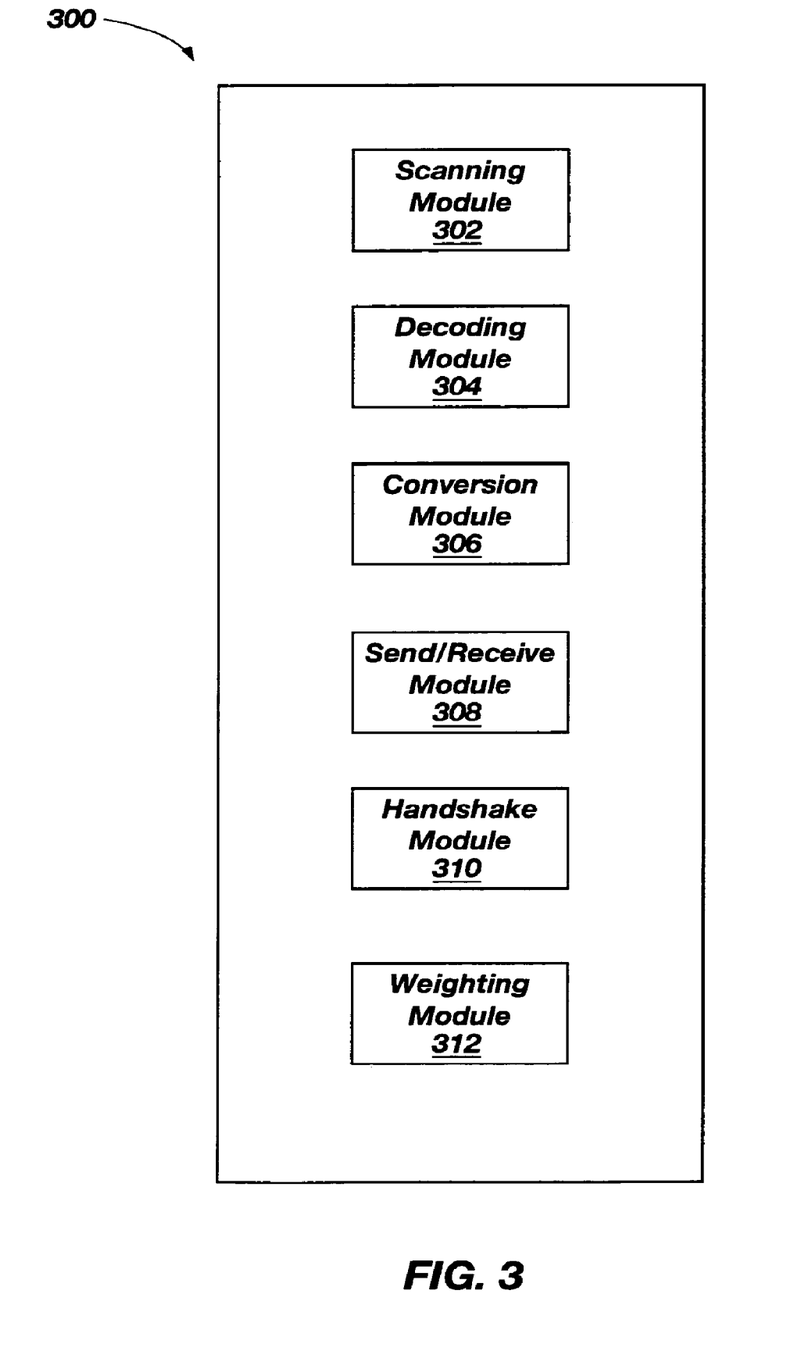
FIG. 3 is a schematic block diagram illustrating another illustrative embodiment of an apparatus for interfacing between a radio frequency devices in accordance with the present invention.

FIG. 3 illustrates one illustrative embodiment of an apparatus 300 according to the present invention. In one embodiment, the apparatus 300 includes a scanning module 302. The scanning module 302 may scan the known radio frequencies of third party or proprietary radio devices 102 (see FIG. 1). In another embodiment, the scanning module 302 detects a signal on a known frequency. The scanning module 302 compares a preamble or a first portion of the signal to the known communications protocol for that frequency to determine if the signal is a valid signal. If the preamble or first portion is validated, then the scanning module 302 accepts and processes the signal. If the preamble or first portion is not validated, the signal is discarded and the scanning module 302 can scan the next frequency. It will be appreciated that by only validating the preamble or the first portion of a signal, the scanning module 302 limits the time spent on any one frequency searching for a valid signal. If the scanning module 302 scans one frequency too long or it takes too long to recognize a valid signal, then a signal on another frequency may be lost.

The apparatus may also include a decoding module 304 configured to decode and/or demodulate a communication protocol utilized by a third-party or proprietary device recognized by the scanning module 302 on a particular frequency used by that third-party of proprietary device. A communication protocol may include without limitation, a signal, communication, or other recognizable information on a particular frequency. The types of communication protocols may include without limitation, FM, AM, OOK, FSK, and the like. The apparatus also includes a conversion module 306 configured to convert the decoded communication protocol into a predetermined communication language that can be interpreted by a controller type device or that can convert a predetermined communication language into a communication protocol. The decoding module 304, in connection with the conversion module 306, is capable of converting the commands and communications of multiple third party and proprietary devices into a single language or communication protocol for sending to a controller.

The apparatus 300 may include a send/receive module 308 configured to send and receive communication packets containing data in the common communication language to and from a controller, respectively. The send/receive module 308 may also be configured to send and receive communication packets to devices in their own proprietary communication protocol.

The apparatus 300 also includes a handshake module 310. The handshake module 310 establishes a communication path or link between the apparatus 300 and a radio frequency controller such that communication packets can be sent and the receipt of the communication packets can be acknowledged.

The apparatus 300 also includes a weighting module 312. The weighting module 312 employs a weighting factor to determine the allowable combination of radio frequencies to be scanned by the scanning module 302. For each scanned frequency, i.e., each communication protocol being scanned for, the weighting module 312 may determine the amount of time required to "lock" onto a signal using a particular protocol. If the time required to recognize a signal is excessive, a signal on another frequency may be missed. Ideally, the scanning module 302 never misses any signals. However, if the scanning module 302 spends too much time away from any one particular frequency while scanning for signals on other frequencies, then a signal on that particular frequency is likely to be missed.

Another factor taken into consideration, is that any particular communications protocol may require that a signal using that protocol be repeated any number of times. In the case where a signal is repeated numerous times, the scanning module 302 may spend more time away from that particular frequency on which the signal is being transmitted. This is because, if a signal is missed while scanning another frequency, the signal is still likely to be received by the apparatus 300 when it returns to the signal's frequency due to the fact that the signal is repeated. Thus, the more times a signal is repeated, the more time the scanning module 302 can spend scanning other frequencies.

Finally, the speed, or transmission rate, of the signal being receiving is taken into consideration by the weighting module 312. If the signal is slow, and each bit time is very long, it will take more time to lock onto a signal. Alternatively, if the signal is very fast, the lock time will be reduced, but the minimum allowed time away from that signal's frequency will also be greatly reduced hindering the allowed time on other channels.

The weighting module 312 may therefore take into account the time required to lock onto and validate a preamble or a first portion of a signal, whether the communication protocols call for repeating a signal, and the transmission rate of the signal being received in order to limit the number of scanned frequencies. In regards to the time required to validate a signal, in the event that the time required to validate is relatively excessive, then the apparatus 300 may be limited to scanning only one or two frequencies. If a communication protocol calls for repeating a signal multiple times, then it is more likely that the scanning module 312 will detect the signal even if the actual time scanning the frequency of the signal is relatively short. If the speed of the signal is slow, and each bit time is very long, it will take more time to validate a signal. Alternatively, if the signal's transmission rate is very fast, the lock time will be reduced, but the minimum time away from the frequency of the signal will be also be reduced hindering the allowed time on other frequencies.

In the illustrative embodiments of the present invention, each communication protocol will be weighted according to the factors discussed above to determine or limit the amount of frequencies scanned by the scanning module 302. This weight will determine the allowable combination of user protocols per apparatus 300. For example, in the case of a protocol that calls for a very fast signal that is not repeated, this protocol could be weighted at 100% meaning that only it would be allowed to operate on apparatus 300. In another example, a protocol that calls for a very fast signal that is repeated ten (10) times could be weighted at 10%. In this case, the apparatus 300 could comfortably scan for this protocol as well as another, assuming that this other protocol does not impair the ability to detect the first protocol.

The illustrations of FIGS. 1, 2, and 3, along with the corresponding discussion above disclose means for determining the frequency of one or more radio devices, means for scanning known frequencies for a communication protocol, means for decoding the communication protocol, means for converting the decoded communication protocol into a predetermined interface language, means for creating a communication packet containing the converted communication protocol means for sending the communication packet to a radio device controller, and means for receiving an acknowledgment that the communication packet was received by the radio device controller.

The schematic flow chart diagrams that follow are generally set forth as logical flow chart diagrams. As such, the depicted order and labeled steps are indicative of one illustrative embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
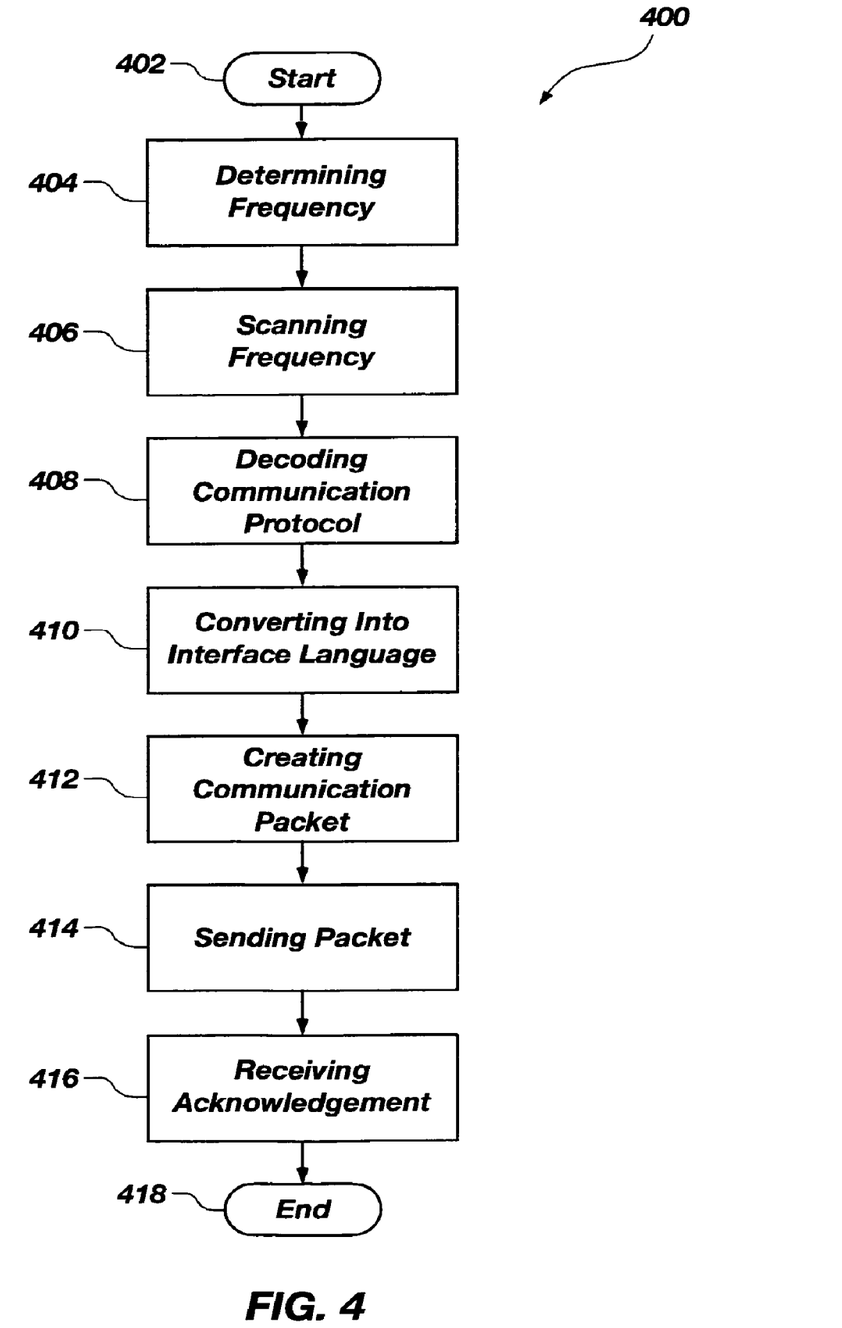
FIG. 4 is a schematic flow chart diagram illustrating one illustrative embodiment of a method in accordance with the present invention.

FIG. 4 illustrates a method 400 of interfacing between radio frequency devices according to the present invention. The method 400 starts 402 by determining 404 the frequency of third party and/or proprietary devices on which the devices operate. Those frequencies are scanned 406 to determine whether or not any signals, communications, or other communication protocols are being transmitted. Signals, communications, and/or communication protocols are then decoded and/or demodulated 408 and converted 410 into a common interface language. In will be appreciated that the common interface language may be in and of itself a communication protocol. The method 400 then creates a communication packet 412 containing the decoded signal from the remote third party and/or proprietary device and sends it to a controller 414. The receipt of the communication packet is acknowledged 416 and the method ends 418.

Figure 5:
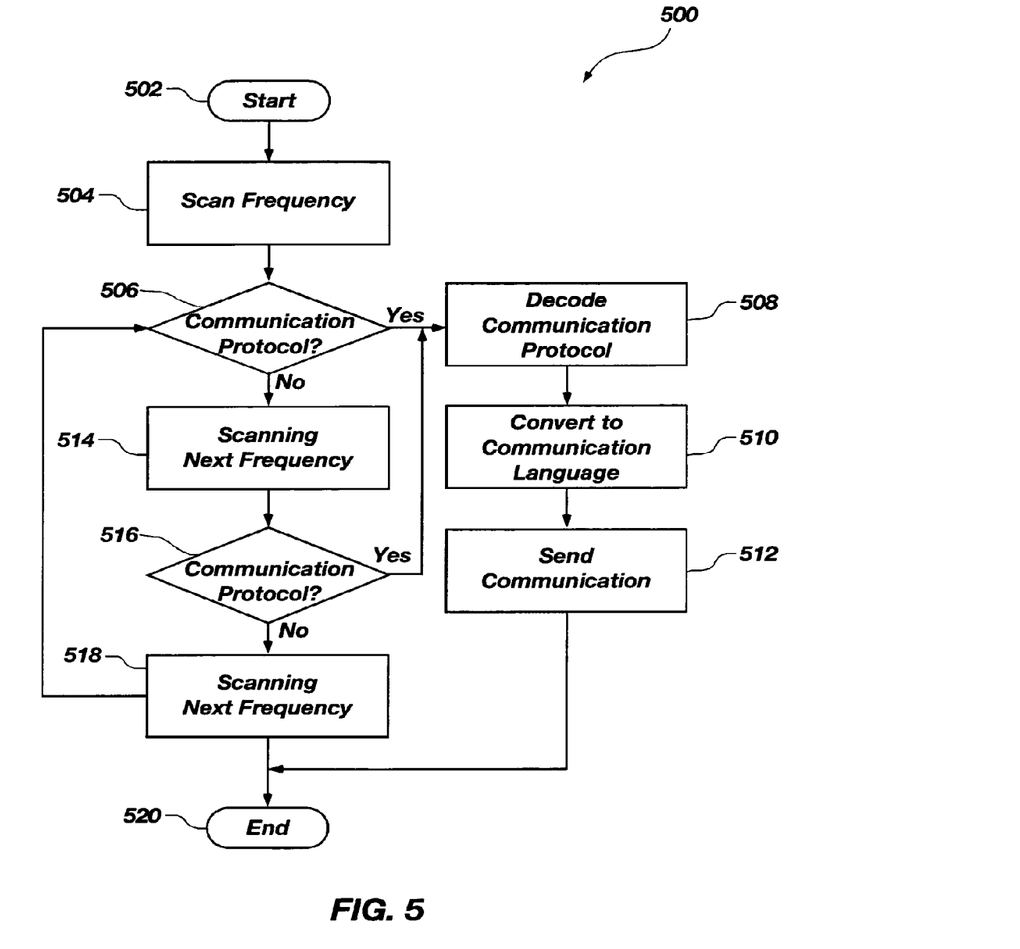
FIG. 5 is a schematic flow chart diagram illustrating another illustrative embodiment of a method in accordance with the present invention.

FIG. 5 illustrates one exemplary embodiment of a method 500 for interfacing between radio devices. The method 500 starts 502 and scans the frequency on which a desired remote device operates. If a communication protocol is not detected 506 on that frequency, a next known frequency is scanned 514. It will be appreciated that it is within the scope of the present invention that when the next frequency is unknown, it can be automatically determined.

If a communication protocol is not detected 516 on this frequency, a next frequency is scanned 518. Previously known or currently determined frequencies are scanned randomly or in order until a signal, communication, or other communication protocol is found. In one exemplary embodiment, known frequencies are scanned in order from a first known frequency until a last known frequency and then the scanning repeats in the same order.

Once a communication protocol is found, it is decoded 508 and converted 510 into a predetermined communication language. The converted communication protocol is then packaged in a communication packet and sent to a controller or other device. In one embodiment, the device is a controller that interacts with a user in order to operate one or more different radio frequency devices, even if those different devices operate at different radio frequencies or different modulations. The process may then repeat or end 520.

Figure 6:
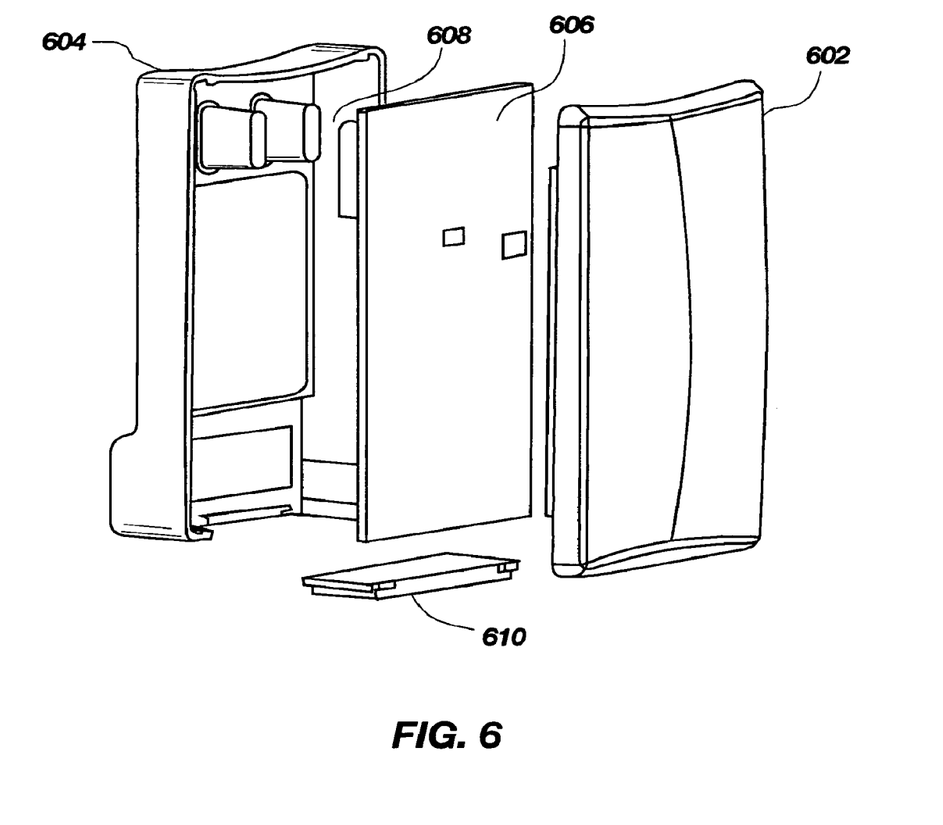
FIG. 6 is a prospective exploded view illustrating one embodiment of an illustrative radio frequency interface apparatus in accordance with the present invention.

FIG. 6 illustrates one illustrative embodiment of an apparatus 600 for interfacing between radio devices according to the present invention. The apparatus 600 may be embodied as a wall-mount structure. The apparatus 600 includes a front cover 602 and a back cover 604. A circuit board 606 may include memory or circuitry for interfacing between third party and/or proprietary devices, and a controller that is operated by a user. The apparatus 600 also includes a power supply 608. A panel 610 may help connect the front cover 602, back cover 604, circuit board 608, and power supply 610.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An interfacing apparatus comprising:
   a scanning module configured to scan a predetermined range of communication protocols associated with a plurality of devices;
   a send/receive module configured to sending and receive distinct communication protocols associated with the plurality of devices, each distinct communication protocol including a communication packets containing information;
   a decoding module configured to decode: (i) each received distinct communication protocol and (ii) the information contained in the communication packet associated with that received and decoded distinct communication protocol;
   and a conversion module configured to convert: (i) a each decoded distinct communication protocol, and (ii) the decoded information contained in the communication packet associated with that received and decoded distinct communication protocol, into at least one of another distinct communication protocol and a common interface language as required by a recipient device;
   a weighting module adapted and programmed to calculate and limit the amount of distinct communication protocols to be scanned for by the scanning module;
   wherein the weighting module limits the amount of communication protocols to be scanned for by the scanning module by weighting each distinct communication protocol based on at least one of: (i) the amount of time required for the scanning module to lock onto a signal on a distinct communication protocol, (ii) the number of times a signal on a distinct communication protocol is repeated, and (iii) the speed of a signal on a distinct communication protocol.

2. The apparatus of claim 1 further comprising a handshake module configured to establish a communication path with a controller so that a communication packet sent by the send/receive module and received by the controller is acknowledged by the controller.

3. The apparatus of claim 1, wherein the information contained in the communication packet of at least one of the received and decoded distinct communication protocols from a first device is status or command information associated with the first device.

4. The apparatus of claim 1 wherein the information contained in the communication packet of at least one of the received and decoded distinct communication protocols from a first device is proprietary information to the manufacturer of the first device.

5. A system for interfacing between devices, comprising:
   a primary radio frequency interface configured to send and receive signals using a common interface language;
   a secondary radio frequency interface configured to: (i) scan a predetermined range of communication protocols associated with at least a first device and a second device, and (ii) send and receive distinct communication protocols associated at least with the first device and the second device, each distinct communication protocol including a communication packet containing information;
   a first device in communication with the primary and secondary radio frequency interfaces, the first device adapted to transmit and receive a first communication protocol, each first communication protocol including a communication packet containing information;
   a second device in communication with the primary and secondary radio frequency interfaces, the second device adapted to transmit and receive a second communication protocol, each second communication protocol including a communication packet containing information;
   at least a first decoding module configured to decode at least: (i) each received first communication protocol, and (ii) the information contained in the communication packet associated with that received and decoded first communication protocol; and
   at least a first conversion module configured to convert at least: (i) each decoded first communication protocol, and (ii) the decoded information contained in the communication;
   comprising a weighting module adapted and programmed to calculate and limit the amount of communication protocols to be scanned for by the secondary radio frequency interface;
   wherein the weighting module limits the amount of communication protocols to be scanned for by the secondary radio frequency interface by weighting each communication protocol based on at least one of: (i) the amount of time required for the secondary radio frequency interface to lock onto a signal on a distinct communication protocol, (ii) the number of times a signal on a distinct communication protocol is repeated, and (iii) the speed of a signal on a distinct communication protocol.

6. The system of claim 5 further comprising at least one contact input in communication with the first device, the at least one contact input configured to detect a momentary switch closure.

7. The system of claim 5 further comprising at least one relay in communication with the first device, the at least one relay configured to be activated to emulate a contact switch closure.

8. The system of claim 5 further comprising a display, the display configured to facilitate use of the primary and secondary radio frequency interfaces by a user.

9. The system of claim 5 further comprising at least a second decoding module configured to decode at least: (i) each received second communication protocol, and (ii) the information contained in the communication packet associated with that received and decoded second communication protocol; and     at least a second conversion module configured to convert at least: (i) each decoded second communication protocol, and (ii) the decoded information contained in the communication packet associated with that received and decoded second communication protocol, into at least one of the first communication protocol and the common interface language to allow communication between the second device and the first device.

10. The system of claim 5 further comprising a first antenna and a second antenna, the first antenna associated with the primary radio interface and the second antenna associated with the secondary radio interface.

11. The system of claim 10 wherein the primary radio interface and the secondary radio interface operate on different frequencies.

12. The system of claim 5, wherein the information contained in the communication packet of at least one of the received and decoded first communication protocols from the first device is status or command information associated with the first device.

13. The system of claim 5, wherein the information contained in the communication packet of at least one of the received and decoded first communication protocols from the first device is proprietary information to the manufacturer of the first device.

14. A system for interfacing between radio devices, the system comprising:
    a processor;
    a radio interface;
    an antenna;
    a transceiver;
    a controller;
    a memory containing modules for execution on the processor, the modules including:
    i) a scanning module configured to scan a predetermined range of communication protocols associated with a plurality of devices;
    (ii) a send/receive module configured to send and receive distinct communication protocols associated with the plurality of devices, each distinct communication protocol including a communication packet containing information;
    (iii) a decoding module configured to decode: (a) each received distinct communication protocol, and (b) the information contained in the communication packet associated with that received and decoded distinct communication protocol;
    iv) a conversion module configured to convert: (a) each decoded distinct communication protocol, and (b) the decoded information contained in the communication packet associated with that received and decoded distinct communication protocol, into at least one of another distinct communication protocol and a common interface language as required by a recipient device;
    v) a handshake module configured to establish a communication path with the controller so that a communication packet sent by the send/receive module and received by the controller is acknowledged by the controller;
    and a bus configured to operably connect the processor antenna, transceiver, radio interface, and memory;
    a weighting module adapted and programmed to calculate and limit the amount of distinct communication protocols to be scanned for by the scanning module;
    wherein the weighting module limits the amount of communication protocols to be scanned for by the scanning module by weighting each distinct communication protocol based on at least one of: (i) the amount of time required for the scanning module to lock onto a signal on a distinct communication protocol. (ii) the number of times a signal on a distinct communication protocol is repeated, and (iii) the speed of a signal on a distinct communication protocol.

15. The system of claim 14, wherein the information contained in the communication packet of at least one of the received and decoded distinct communication protocols from a first device is status or command information associated with the first device.

16. The system of claim 14, wherein the information contained in the communication packet of at least one of the received and decoded distinct communication protocols from a first device is proprietary information to the manufacturer of the first device.

17. A system for interfacing between devices comprising:
    a processor;
    a memory containing modules for execution on the processor, the modules including:
    (i) a scanning module configured to scan a predetermined range of communication protocols associated with a plurality of devices;
    (ii) a weighting module adapted and programmed to calculate and limit the amount of distinct communication protocols to be scanned for by the scanning module;
    (iii) a send/receive module configured to send and receive distinct communication protocols associated with the plurality of devices, each distinct communication protocol including a communication packet containing information;
    (iv) a decoding module configured to decode: (a) each received distinct communication protocol, and (b) the information contained in the communication packet associated with that received and decoded distinct communication protocol;
    (v) a conversion module configured to convert: (a) each decoded distinct communication protocol, and (b) the decoded information contained in the communication packet associated with that received and decoded distinct communication protocol, into at least one of another distinct communication protocol and a common interface language as required by a recipient device; and
    wherein the weighting module limits the amount of communication protocols to be scanned for by the scanning module by weighting each distinct communication protocol based on at least one of: (i) the amount of time required for the scanning module to lock onto a signal on a distinct communication protocol, (ii) the number of times a signal on a distinct communication protocol is repeated, and (iii) the speed of a signal on a distinct communication protocol.

18. The system of claim 17, wherein the information contained in the communication packet of at least one of the received and decoded distinct communication protocols from a first device is status or command information associated with the first device.

19. The system of claim 17, wherein the information contained in the communication packet of at least one of the received and decoded distinct communication protocols from a first device is proprietary information to the manufacturer of the first device.

* * * * *